Aug. 11, 1959 — N. E. O'CONNOR — 2,898,712
WORK TOOL

Filed Oct. 10, 1957

INVENTOR.
Neal E. O'Connor
BY
L.O. Burch
ATTORNEY

Aug. 11, 1959 — N. E. O'CONNOR — 2,898,712
WORK TOOL
Filed Oct. 10, 1957 — 2 Sheets-Sheet 2
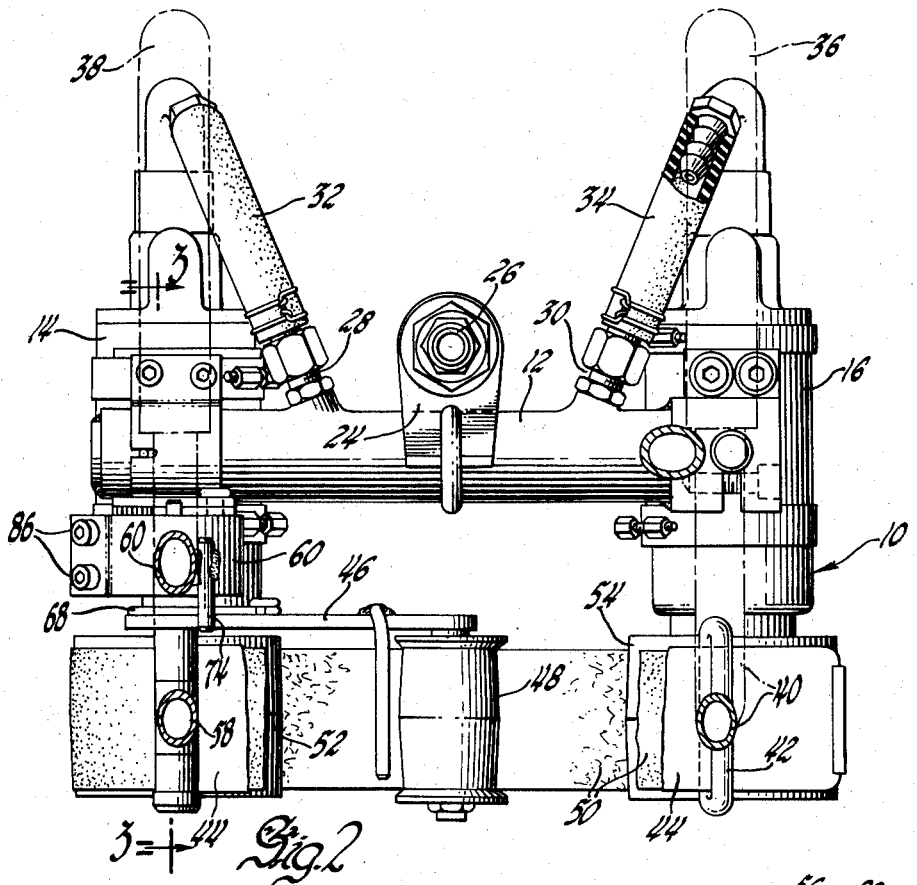
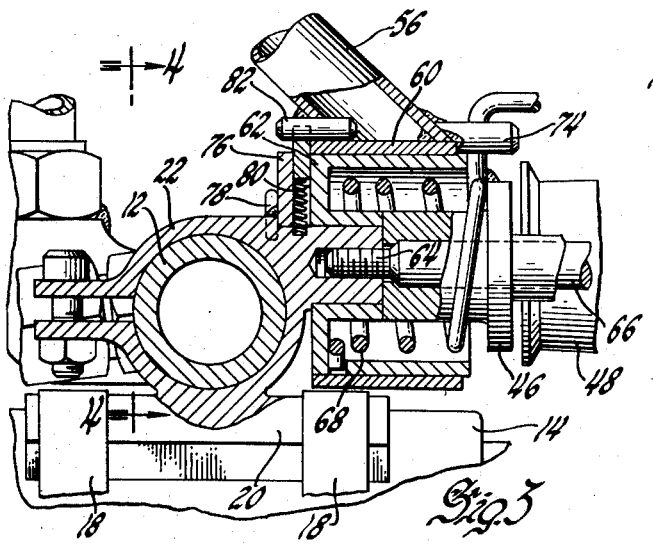
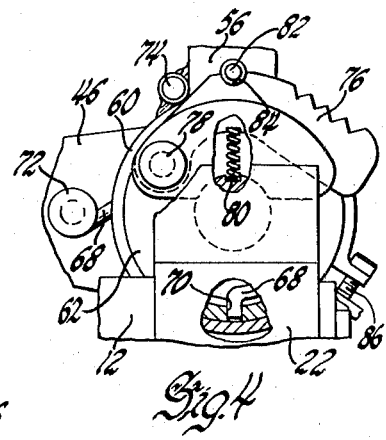
INVENTOR.
Neal E. O'Connor
BY
L. D. Burch
ATTORNEY United States Patent Office 2,898,712
Patented Aug. 11, 1959

2,898,712
WORK TOOL

Neal E. O'Connor, Birmingham, Mich., assignor to General Motors Corporation, Detroit, Mich., a corporation of Delaware Application October 10, 1957, Serial No. 689,368

7 Claims. (Cl. 51—170)

This invention relates to polishing or sanding work tools and more particularly to means for tensioning and readily removing the work belt used therewith.

Sanding or polishing tools which make use of a continuous work belt require some means of tensioning the work belt on the power driven rollers of the work tool. Such tensioning means may be incorporated with other means for readily removing the belt from the work tool when it becomes worn. In the past, such tensioning means have included having the work belt receiving power driven rollers of the work tool movable relative to each other or some form of adjustable idler roller disposed between the power driven roller means. The adjustment of the power driven rollers usually requires spline fittings, couplings, or expensive machining operations. The separate adjustment of an idler roller, while less expensive, usually is inaccessible or awkward to operate.

It is here proposed to provide adjustment means for a sanding or polishing tool having a continuous belt whereby the belt may be removed from the tool or tensioned thereon by means of an idler roller which is operatively connected to one of the handles of the work tool. In this way no adjustment of the power driven rollers is required so that the run of the belt need not be disturbed. The adjustment of the idler pulley by means of the handle is also such as may be readily accomplished by even the most unskilled operator.

In the drawings:

Figure 2 is a top view of the work tool embodying this invention having parts broken away and shown in cross section.

Figure 3 is a cross-sectional view taken in the plane of line 3—3 of Figure 2.

Figure 4 is a cross-sectional view taken in the plane of line 4—4 of Figure 3 and shows the handle latching mechanism.

Figure 1:
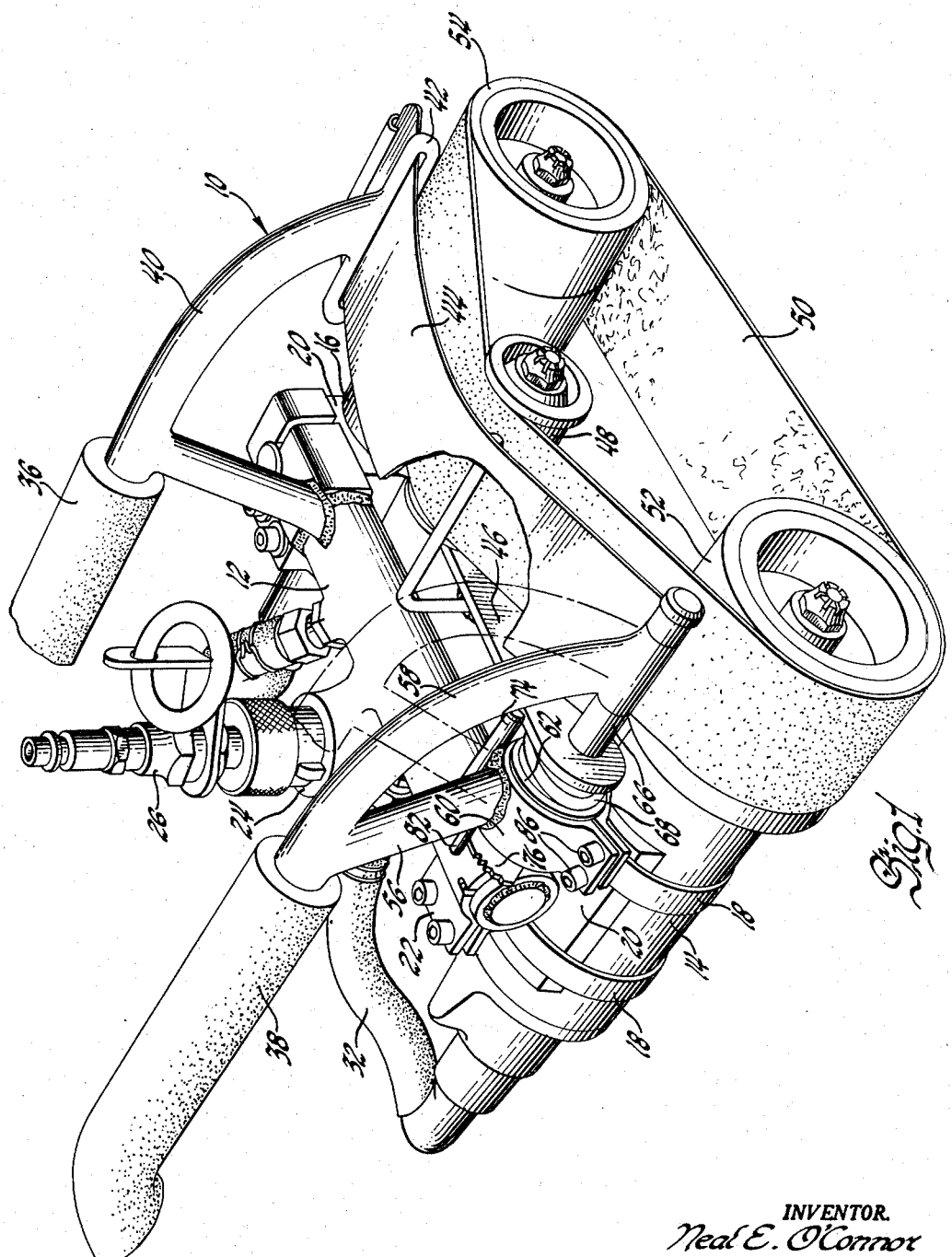
Figure 1 is an illustration of the proposed work tool and shows, in dotted lines, the movement of one of the handles for adjusting the idler pulley.

This invention is illustrated as incorporated within an air operated sanding device 10 which includes an air manifold 12 having air driven motors 14 and 16 secured to opposite ends thereof by straps 18 holding the motors to a saddle 20 which is a part of the collar clamp 22 received on the end of the manifiold 12; as best shown in Figure 3. The air inlet to the air manifold 12 is disposed centrally of the manifold as at 24 and includes a snap coupling device 26 to which an air hose may be attached. Air is supplied from the manifold 12 to the motors 14 and 16 through outlet fittings 28 and 30 and flexible conduits 32 and 34 connecting into the ends of the air motors.

Handles 36 and 38 are provided for holding the work tool. Handle 36 is secured to the air manifold 12 and includes a forwardly extending arm 40 having the end thereof formed as at 42 to receive the end of a sanding shield 44. The other handle 38 is adjustable, as will be described, and includes therewith a lever arm 46 having an idler pulley 48 rotataby mounted at the end thereof and disposed to receive the sanding belt 50 which extends around the idler pulley and the two power driven pulleys 52 and 54 which are operated by the air motors 14 and 16 respectively.

The handle 38 includes forked arms 56 and 58. The one arm 56 includes a sleeve or collar 60 rotatable about a bearing drum 62 secured to the collar clamp 22 by fastener means 64 formed on the end of the shaft 66 which extends out to receive the end of the other forked arm 58 of the handle 38. The lever arm 46 is mounted upon the shaft 66 and is rotatable therewith as the handle 38 is pivoted on the drum 62. A helical spring 68 within the fixed drum 62 has one end keyed to the drum as shown in the cutaway indicated by numeral 70 in Figure 4 and has the other end engaged with a stop 72 provided on the lever arm 46. In this way the spring 68 serves to bias the lever arm 46 upwardly to hold the idler pulley 48 in a belt tensioning position.

An operator arm 74 is secured to the handle 38 near the sleeve member 60 and is extended outwardly over the lever arm 46 in a position to engage and depress such lever arm so as to prevent the release of a preset work belt, tensioning of spring 68 below a certain angular positioning. It is by this means that the idler pulley 48 on the end of the lever arm 46 is moved to relieve the tensioning of the helical spring 68, out of its normal belt tensioning position.

A simple latch arm 76, pivoted as at 78 to the end of the fixed drum 62 and biased by a spring 80, engages a pin 82 on the arm 56 of the pivotal handle within a detent 84 thereof to hold the arm and consequently the pivotal handle in a locked position.

The steps necessary to remove a work belt 50 from the driving pulleys 52 and 54 and from the idler pulley 48 are as follows:

The latch 76 is depressed and the handle 38 is pivoted down toward the work tool into a position as shown by the dotted lines in Figure 1. This movement of the handle causes the member 74 to engage the lever arm 46 to relieve the tensioning of spring 68 and moving such arm of the idler pulley downwardly with a corresponding movement of the idler pulley 48 out of its normal belt tensioning position. The sanding belt 50 may then be removed and replaced with a new belt. The steps just mentioned are followed in reverse in order to tension the new belt on the work tool.

Adjustment of the work belt tensioning for the most efficient sanding of large or small radius curves is as follows:

With the work belt in position, the clamping screws 86 which hold the sleeve or collar 60 to the bushing or drum 62 are backed off. The bushing or drum 62 may then be rotated within collar 60 to provide for increased or decreased tensioning of the helical spring 68 by movement of the spring end keyed to the sleeve 60, illustrated in Figure 4 at 70, with respect to the other spring end engaged with stop 72 provided on the lever arm 46, and then tightening screws 86.

It will be appreciated that the proposed work tool including the suggested belt tensioning means includes no splined connecting joints or other expensive machining as regards the belt tensioning feature. A solid "tie bar" air manifold is provided to which the air powered motors are secured and once secured are fixed unless some unusual occurrence necessitates realignment of the air motors. The idler wheel positively "tracks" the belt on the motor pulleys so that the belt cannot ride to either the front or the back of the pulleys despite any slight misalignment in the driving pulleys. All parts which are subjected to wear preferably include rotary bearings.

This, with the absence of sliding members, is particularly important in an abrasive atmosphere where the wear tendency is high.

These and other advantages should become more apparent from a study of this application and from the use and operation of the specific device disclosed.

What is claimed is:

1. A belt sander device including a housing member having a pair of axially fixed and rotatable belt pulleys mounted thereon and extended in parallel spaced relation for receiving a belt member therebetween, at least one of said pulleys being power driven, handles provided near each end of said housing, one of said handles being pivotally mounted to said housing and having a lever arm engaged and pivotal therewith, and an idler belt pulley mounted on the end of said lever arm and disposed in parallel spaced relation between said first-mentioned belt pulleys and in a position to receive said belt thereover, said idler pully being operable with said handle to relieve and tension the belt received about each of said pulleys.

2. An air driven belt sander device having a one-piece air manifold, air driven motor means connected to said air manifold and supported thereby in fixed spaced relation near opposite ends thereof, axially fixed and rotatable belt pulleys operatively connected to said motor means and extended in parallel spaced relation therefrom for receiving a belt member therebetween and thereover, a handle mounted on one of said motor means for lifting said device, and an idler pulley pivotally mounted with said handle and disposed in parallel spaced relation between said other mentioned pulleys for receiving said belt thereover, said idler pulley being fixed in belt tensioning position with said handle disposed in position for lifting said device.

3. An air driven belt sander device having a one-piece air manifold, air driven motor means connected to said air manifold and supported thereby in fixed spaced relation near opposite ends thereof, axially fixed and rotatable belt pulleys operatively connected to said motor means and extended in parallel spaced relation therefrom for receiving a belt member therebetween and thereover, a handle pivotally mounted on one of said motor means and adapted for lifting said device, an idler pulley pivotally mounted with said handle and disposed in parallel relation between said other mentioned pulleys for receiving said belt thereover, spring means engaging and biasing said idler pulley in belt tensioning position, and said handle including an arm disposed to effectuate the withdrawal of said idler pulley from its belt tensioning position upon pivotal movement of said handle.

4. The belt sander device of claim 1 including means for locking said handle and said lever arm therewith in position for ready use of said handle and tensioning of said belt through said lever arm.

5. The belt sander device of claim 1 including means on said handle positively engaging said lever arm to move said arm out of tensioning relation with said belt upon pivotal movement of said handle, and means engaged between said arm handle for yieldingly holding said arm to said handle and providing yielding tensioning of said belt.

6. A portable work tool including a pair of air motors each having a work belt receiving pulley operatively engaged with and driven thereby, an air manifold having said air motors secured in spaced relation and at opposite ends thereof, flexible air passage means connecting said air motors to said air manifold, handles for lifting and moving said work tool, said handles being secured to said air manifold, one of said handles being pivotal about an axis substantially parallel with said air motor axes, a lever arm pivotal with said one handle about said handle axis and having an idler pulley provided at the end thereof between said work belt receiving pulleys, spring means coacting between said manifold and said lever arm for biasing said lever arm and said idler pulley into a work belt tensioning position, and an operator arm secured to said one handle and disposed to engage said lever arm upon pivotal movement thereof for depressing said lever arm and said idler pulley out of work belt tensioning position.

7. A belt sander device including a housing member having a pair of axially fixed and rotatable belt pulleys mounted thereon and extended in parallel spaced relation for receiving a belt member therebetween, at least one of said pulleys being power driven, handles provided near each end of said housing, one of said handles being pivotally mounted to said housing and having a lever arm engaged and pivotal therewith, an idler belt pulley mounted on the end of said lever arm and disposed in parallel spaced relation between said first-mentioned belt pulleys and in a position to receive said belt thereover, and an idler belt pulley lever, said idler pulley being operable by said lever to relieve and tension the belt received about each of said pulleys.

References Cited in the file of this patent

UNITED STATES PATENTS

| | | |
|---|---|---|
| 2,279,782 | Fowler | Apr. 14, 1942 |
| 2,617,239 | Steurer | Nov. 11, 1952 |
| 2,761,256 | O'Connor | Sept. 4, 1956 |